United States Patent [19]

Ridler et al.

[11] 4,200,828
[45] Apr. 29, 1980

[54] PIVOTED ARM CONTROL ARRANGEMENT

[75] Inventors: Keith D. Ridler, Cambridge; Dexter R. Plummer, Ongar, both of England

[73] Assignee: Streathern Audio Limited, Belfast, Northern Ireland

[21] Appl. No.: 874,484

[22] Filed: Feb. 2, 1978

Related U.S. Application Data

[63] Continuation of Ser. No. 626,564, Oct. 28, 1975.

[30] Foreign Application Priority Data

Oct. 30, 1974 [GB] United Kingdom ............... 47030/74

[51] Int. Cl.² ............................................. G11B 3/10
[52] U.S. Cl. .................................. 318/558; 274/23 R; 179/100.4 R; 318/676
[58] Field of Search ............ 274/1 R, 23 R; 318/676, 318/558; 179/100.4 R, 100.41

[56] References Cited

U.S. PATENT DOCUMENTS

| 3,623,734 | 11/1971 | Sakamoto | 274/1 R |
| 3,731,938 | 5/1973 | Wren | 274/23 R |
| 3,830,505 | 8/1974 | Rabinow | 274/23 R X |

FOREIGN PATENT DOCUMENTS 2354530  10/1974  Fed. Rep. of Germany ........ 274/23 R Primary Examiner—B. Dobeck
Assistant Examiner—J. W. Redman
Attorney, Agent, or Firm—Cushman, Darby & Cushman

[57] ABSTRACT

Apparatus for controlling the movement of a phonograph arm, pivoted for movement in horizontal and vertical planes, so as to maintain a desired stylus pressure. Displacement of the stylus resulting, for example, from passages of heavy modulation is used to generate electrical signals. A feedback system utilizes these signals to control the operation of horizontal and vertical rotational control devices.

5 Claims, 6 Drawing Figures

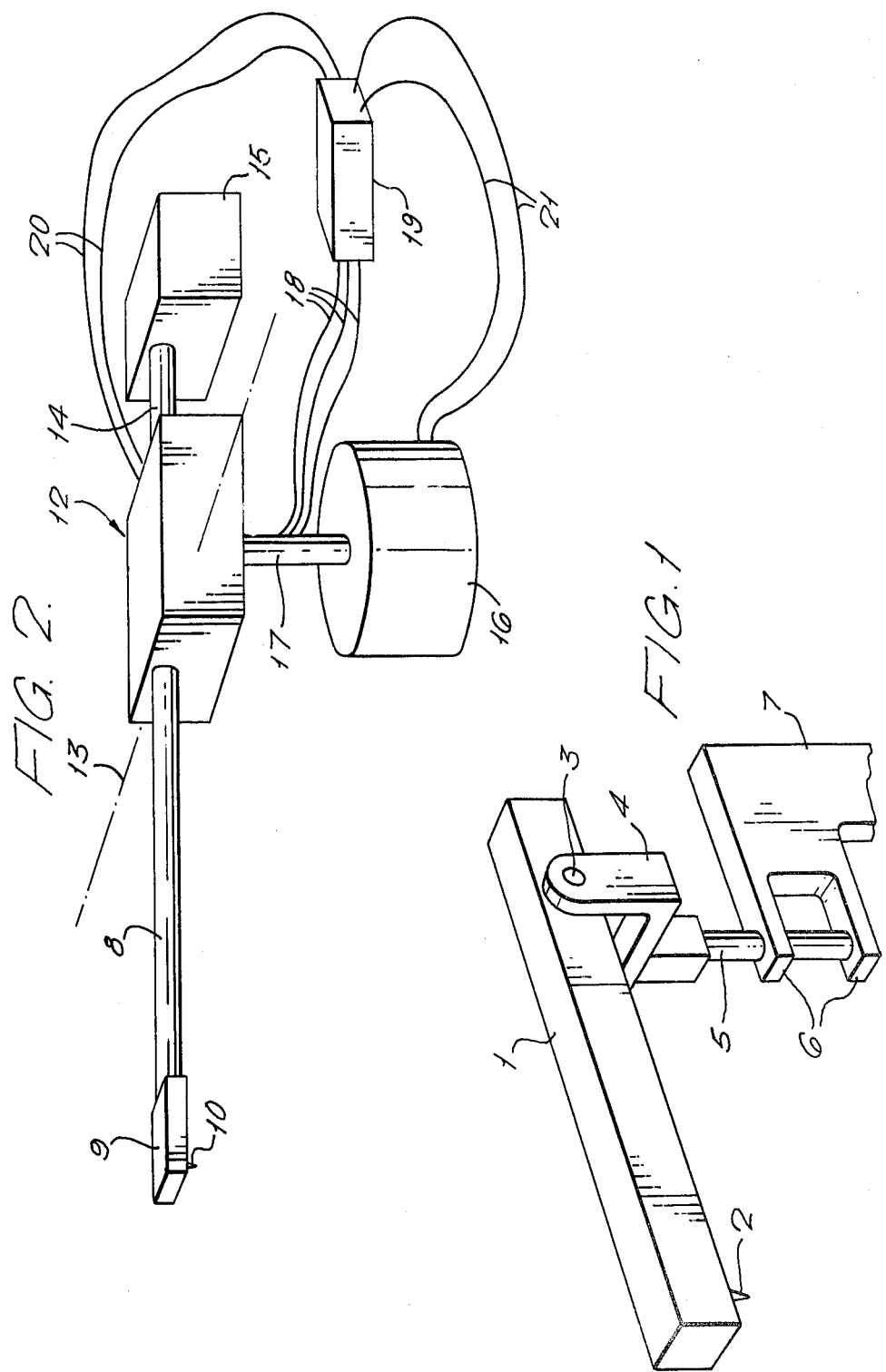

PIVOTED ARM CONTROL ARRANGEMENT

This is a continuation of application Ser. No. 626,564 filed Oct. 28, 1975.

This invention relates to arrangements for use in controlling the movement of a pivoted arm and it has particular, though not exclusive, application in controlling the movement of a phonograph pick-up arm.

It is known to control the pressure of a stylus on a pick-up arm upon the surface of a phonograph record by the use for example of an adjustable counter-balance weight acting on the opposite side of the horizontal pivot axis of the pickup arm to the stylus.

The present invention provides an arrangement which can be used to control the pressure of the stylus of a pickup arm upon the surface of a photograph record, either with or without a counter-balance weight and which can also be used, if required, in the action of raising the stylus from the surface of the record so that it can be removed to a rest position.

Figure 3A:
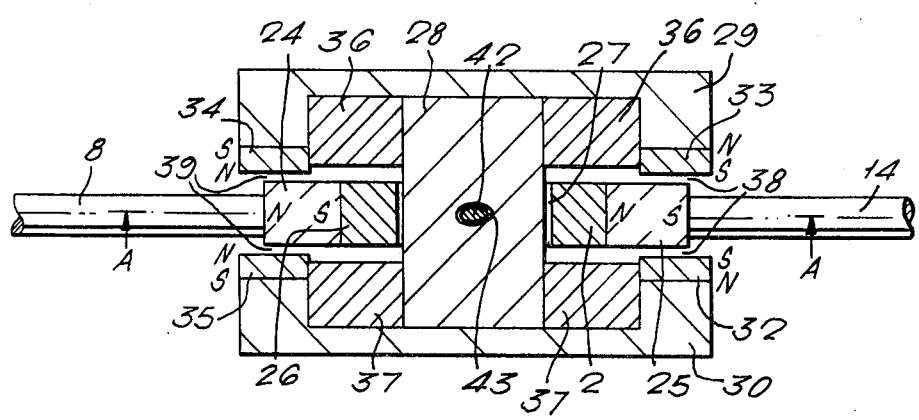
Figure 3B:
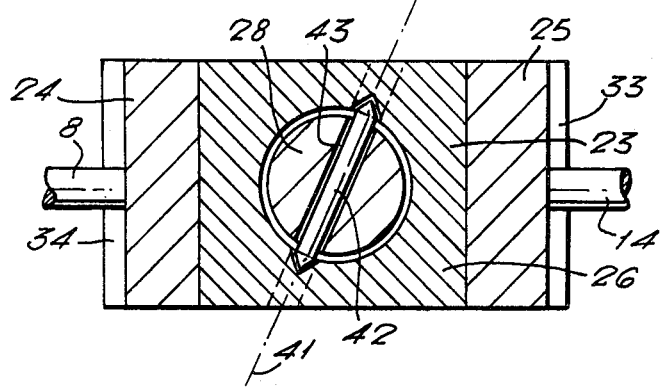
Figure 4:
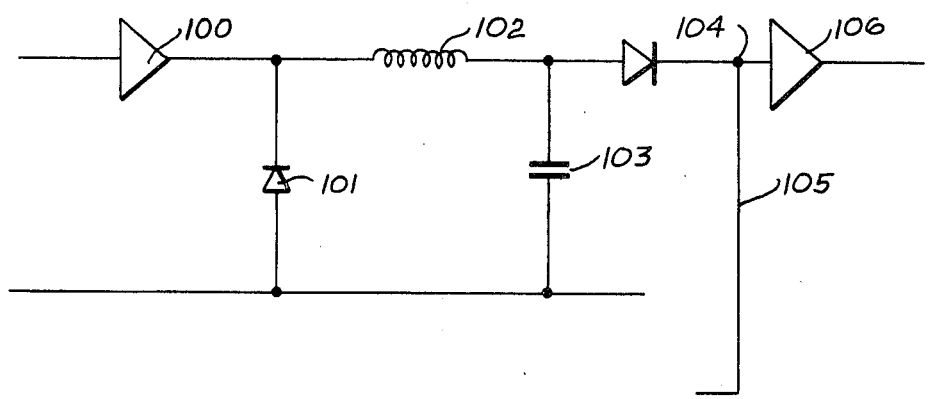
Figure 5:
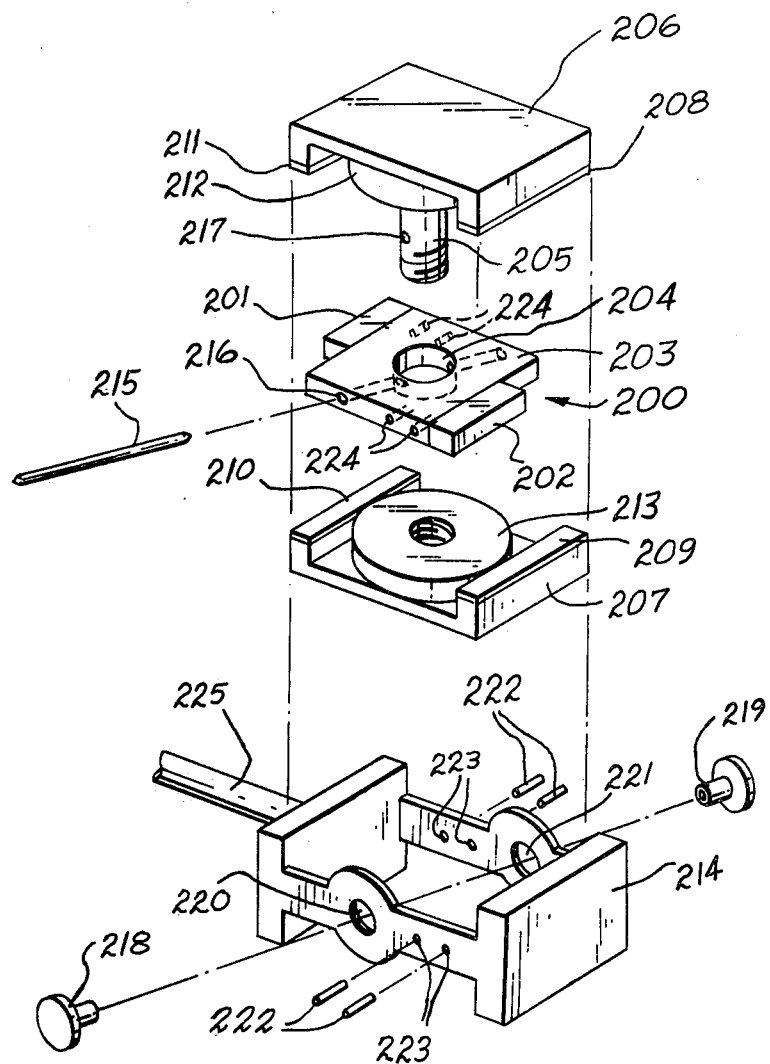

A previously proposed arrangement will now be described, together with an embodiment of the invention, by way of example, with reference to the accompanying drawings in which:

FIG. 1 shows a perspective view of a previously proposed pickup arm mounting arrangement, FIG. 2 shows a perspective view of a mounting arrangement in accordance with the present invention, and FIG. 3 shows at A and B vertical and horizontal cross-sections through a part of the arrangement shown in FIG. 2, FIG. 4 is an electrical circuit diagram and FIG. 5 is an exploded perspective view of a magnet assembly.

Referring to FIG. 1 there is shown a pickup arm 1 which carries a stylus 2 and which is pivotally mounted by a pin 3 upon a cradle 4. The cradle 4 is rotatably carried by a shaft 5 which passes through bearings in arms 6 of a member 7. It will thus be seen that the arm 1 has a freedom of movement both vertically and horizontally, since the cradle 4 with its bearing pin 3 and the member 7 carrying the shaft 5 in bearings in the arms 6 form a gimbal arrangement.

Referring to FIG. 2, there is shown a phonograph pickup arm 8, which carries at one end a head 9 having a stylus 10. The arm 8 extends through a casing 12 which houses a vertical movement control and mounting assembly. The mounting assembly includes an element corresponding to the cradle 4 of FIG. 1. The arm 8 is attached to a part of the assembly which is pivoted about an axis 13 and to the other side of which an arm 14, which carries a counter-balance weight 15, is attached. The element of the control and mounting assembly corresponding to the cradle 4 is coupled to a horizontal rotation device 16 via a rotatable shaft 17. The device 16 can be used to provide an electrical output according to the angular rotation of the shaft 17 and/or control the degree of rotation in the way described in our co-pending patent application Ser. No. 598,872 filed July 24, 1975.

An electrical output on three wires 18 from the pickup head 9 is fed to a control circuit 19 from which signals for driving the vertical movement assembly housed in the casing 12 and the horizontal rotation device 16 are obtained on the two wires 20 and the pair of wires 21 respectively.

The vertical movement control assembly housed in the casing 12 will now be described with reference to FIGS. 3A and 3B without detailed reference to the mounting of the assembly.

Referring to FIGS. 3A and 3B, the arms 8 and 14 are shown attached to the opposite ends of a part 23 which is constituted by a pair of permanent magnets 24 and 25 and a central 26 made of a magnetic material such as iron or mild steel. The part 23 has a central hole 27 through which a steel or iron core 28 passes with a clearance all round of about 1 mm. The core 28 forms a part of a yoke assembly which also includes upper and lower parts 29 and 30. The parts 29 and 30 provide four pole pieces on each of which there is a respective auxiliary stabilizing magnet 32 to 35. Within each of the parts 29 and 30, and around the core 28, there is a respective coil 36 and 37. It will be seen that between the pole pieces 32 and 33 and the pole pieces 34 and 35 there are respective air gaps 38 and 39.

The yoke assembly, including the core 28 and the parts 29 and 30, is mounted upon a vertical shaft (not shown), corresponding to shaft 17 of FIG. 2, which extends from the core 28 and allows the assembly to be rotated about an axis 50. The part 23 can be separately pivoted about an axis 41 by virtue of the fact that a pivot pin 42 extends through a hole 43 in the core 28 into bearings in the part 23.

The permanent magnets 24 and 25 are arranged in their respective air gaps 38 and 39 with their magnetic axes not parallel to the magnetic flux in their air gaps and not parallel to the horizontal pivot axis 41.

If the moment of the compound magnet part 23 equals M, the strength of each of the fields 38 and 39 in which it operates equals H and the angle between the longitudinal axis of the compound magnet part 23 and the direction of the field 38 or 39 equals $\theta$, then the turning moment experienced by the compound magnet part 23 equals $MH\sin\theta$.

If the angle between the transverse axis of the compound magnet part and the horizontal pivot axis 41 is equal to $\phi$, then the turning moment of the compound magnet part about the pivot axis 41 is $MH\sin\theta\sin\phi$, assuming the magnetic fields 38, 39 are perpendicular to the horizontal pivot axis 41.

It is thus possible for current to be supplied from the control circuit 19 to the coils 36 and 37 such that, taking into account the effect of the counter-balance weight 15, the reactions between the pole pieces 32 and 33 and the magnet 25 and the pole pieces 34 and 35 and the magnet 24 cause the stylus 10 to rest in a record groove during the playing of a record with a required amount of pressure. Similarly the current supplied via the leads 21 from the circuit 19 to the device 16 can also be adjusted so that the stylus exerts a required pressure on a side wall of the groove of a record.

It will be understood that, during the playing of a record, there will be passages of heavy modulation that cause the stylus to vibrate with greater intensity at these times than at other times and that, although it is desirable to maintain the stylus in contact with the record at all times, it is not desirable to apply a force to the stylus that is greater than is necessary.

The present invention provides an arrangement which enables the forces, which are applied to a stylus in order to maintain it in contact with a record, to be varied during the playing of the record. By use of this invention, it is possible to set the forces to the minimum values which are required for a major portion of a record and to rely on the arrangement of the present invention to provide the necessary adjustment during the playing of any passages with comparatively heavy modulation. A signal derived from the pick-up head 9 is thus applied via the leads 18 to the control circuit 19 which varies the supply of power via the leads 20 to the vertical movement or tracking control arrangement housed in the casing 12 and via the leads 19 to the rotational or bias control motor device 16 according to the signal on the leads 18. It will be understood that one of the leads 18 is connected to earth and that each of the other leads 18 is connected to a respective one of the channels from the pick-up head 9. Thus the flow of current to the tracking and bias motors can be varied, as required, in accordance with a predetermined law or laws and the value of the signals obtained from the pick-up head 9. Thus in the simplest embodiment, either or both channels is detected and used to change the tracking and bias forces substantially in the same proportion. However, the signals from two channels can be used separately to control the tracking and bias forces on the stylus independently in such a way for example that the stylus force is increased on that wall of the groove of a record on which information imparting a higher amplitude movement is recorded than on the other, when there is a significant difference between the two channels.

In a particular embodiment, the output from the head 9 is first amplified in a pre-amplifer and then rectified and smoothed before being used to control the output of a power amplifier supplying power to the vertical and horizontal rotation control devices 12 and 16. It will be understood that, in order to avoid unnecessary variations in the output level of the power amplifier, a limiter can be included in the circuit in order to prevent variations in the input signal below a given level from causing variations in the output of the power amplifier.

It is possible for the changes in the output level of the power amplifier to be continuously variable or to be switched from one level to another. The rate of change of the tracking and bias forces should not be so rapid that a spurious audio signal is produced and preferably the input to the power amplifier includes an integrating circuit to smooth out any rapid variations.

Alternatively, the relationship between the rise and fall times of the output of the power amplfer can be suitably modified by deliberately arranging that there is a difference between the input impedance of the power amplifier and the impedance of the smoothing circuit plus the output impedance of the pre-amplifier. The rise time should be short enough to respond to a sudden large change in amplitude but long enough not to produce a spurious output. The fall time can be longer (several seconds) with advantage, so that when playing a succession of bursts of high modulation, the arrangement does not attempt to make the tracking weight increase for each individual burst and fall between the bursts.

More than one input signal (for example one from each of the channels of a stereo head) can be applied to the control circuit 19 and can be summed at the input to the power amplifier, either directly in the case of a continuously variable arrangement or by means of an OR gate in the case of a switched level system.

It is, of course, possible to control either of the vertical or horizontal drive devices 12 and 16 instead of both by use of the system described.

In one arrangement the pre-amplifier has a frequency response which is not level and which, for optimum performance, is arranged to compensate the frequency response of a pick-up head whose ability to track a record is frequency dependent.

One arrangement will now be described with reference to FIG. 4 of the accompanying drawings which shows an electrical circuit arrangement including a pre-amplifer 100 to whose input the output from the head 9 is connected. The output from the pre-amplifier 100 is applied across a diode 101 which effectively bypasses the negative half cycle and allows the positive half cycle to be applied to a smoothing circuit including a series inductor 102 and a shunt capacitor 103. The output from the smoothing circuit is applied to a summation point 104 to which the outputs from similar smoothing circuits, as indicated by the lead 105, are connected. The output from the summation point 104 is applied to the input of a power amplifier 106, whose output is used to control the vertical and horizontal rotation devices 12 and 16.

A practical embodiment of the invention will now be described with reference to FIG. 5 of the accompanying drawings which is an exploded perspective view of parts of a tracking motor assembly.

Referring to FIG. 5, there is shown a magnet assembly 200 consisting of a magnet 201, a magnet 202 and a central part 203 made of a magnetic material such as iron or mild steel. The assembly 40 has a central hole 204 through which an iron or steel core 205 passes with a clearance all round of about 1 mm. The core 205 forms a part of a yoke assembly which also includes upper and lower parts 206 and 207. The parts 206 and 207 provide four pole pieces on which there is a respective auxiliary stabilizing magnet 208 to 211. Within each of the parts 206 and 207 there is a respective coil 212 and 213 through which the core 205 passes when the assembly 200 and the parts 206 and 205 are assembled into a unit with air gaps between the opposite pairs of pole pieces 208, 209 and 210, 211 into which the magnets 202 and 201 extend respectively. The assembled unit is arranged within a frame 214 and a pin 215 is passed through a hole 216 in the central part 203 of the assembly 200 and a hole 217 in the core 205. The ends of the pin 215 are mounted in bearings 218 and 219 in respective holes 220 and 221 in the frame 214. The assembly 200 is fixed relative to the frame 214 by pins 222 which pass through holes 223 in the frame 214 into holes 224 in the assembly 200. A phonograph pick-up arm 225 extends from one end of the frame 214. It can thus be seen that the complete assembly is rotatable about the longitudinal axis of the core 205 while the frame 214 together with the assembly 200 can be pivoted about the pin 215 relative to the yoke assembly constituted by the core 205, the upper and lower parts 206 and 207 and the coils 212 and 213. The operation of the arrangement is as described with reference to that of FIG. 3.

It will be understood that, although the invention has been described with reference to particular embodiments, variations and modifications can be made within the scope of the invention. For example the coils, which in the arrangements described are shown controlled by a common signal and can be connected either in series or in parallel, could be controlled indpendently and a differential effect could be introduced into the control of the vertical movement of the stylus, either between fields produced by two varying signals applied to respective coils or between fields produced by a varying signal and a relatively steady but adjustable bias signal applied to respective ones of the coils.

We claim:

1. Apparatus for use in controlling the movement of an arm which is pivoted for movement in first and second orthogonal planes including means to generate a first electrical signal related to a movement of the arm in one direction in the first plane, a first motor arranged to move the arm in a direction opposite to the one direction, control means, an input of the control means being coupled to the said first signal and an output of the control means being coupled to the first motor and arranged to cause a force tending to counter movement of the arm in the one direction to be applied to the arm in accordance with the first signal, the first motor comprising a magnet attached to the arm for movement about orthogonal axes, the pivot axis of the arm and the magnet for movement thereof in the first plane being coincident and passing through the motor, and the pivot axis of the arm and of the motor for movement thereof in the second plane being coincident and passing through the motor and the first-mentioned axis at right angles thereto, stabilizing magnet pole pieces arranged one on each side of the magnet with their fields arranged to oppose the movement of the said magnet in the first direction and in a direction opposite to the first direction and a coil to which the output from the control means is coupled arranged to modify the said opposing fields according to a signal applied thereto.

2. Apparatus as claimed in claim 1, the first motor being constituted by a magnet attached to the arm for movement therewith, stabilizing magnet pole pieces arranged one on each side of the magnet with their fields arranged to oppose the movement of the said magnet in the first direction and in a direction opposite to the first direction and a coil to which the output from the control means is coupled arranged to modify the said opposing fields according to a signal applied thereto.

3. Apparatus as claimed in claim 1 including means to generate a second electrical signal related to the movement of the arm in a second direction in the second plane, a second motor arranged to move the arm in a direction opposite to that of the second direction, an input of the control means being coupled to the second signal and an output of the control means being coupled to the second motor and arranged to cause a force tending to counter movement of the arm in the second direction to be applied to the arm in accordance with the second signal.

4. Apparatus as claimed in claim 3 including a first amplifier connected to the output of the means for generating the first electrical signal, a rectifying and smoothing circuit connected to the output of the first amplifier, and a second amplifier whose input is connected to the output of the rectifying and smoothing circuit and whose output is connected to the first motor.

5. Apparatus as claimed in claim 4 including means to connect the output of a second rectifying and smoothing circuit, to whose input the second electrical signal is connected, to the input of the second amplifier, the output of the second amplifer being connected to the first and second motors.

* * * * *